US012307598B2

(12) United States Patent
Veeravarasapu et al.

(10) Patent No.: US 12,307,598 B2
(45) Date of Patent: May 20, 2025

(54) SYSTEM AND METHOD FOR GENERATING SIMULATED SCENES FROM OPEN MAP DATA FOR MACHINE LEARNING

(71) Applicant: Insurance Services Office, Inc., Jersey City, NJ (US)

(72) Inventors: Venkata Subbarao Veeravarasapu, Munich (DE); Maneesh Kumar Singh, Lawrenceville, NJ (US)

(73) Assignee: Insurance Services Office, Inc., Jersey City, NJ (US)

( * ) Notice: Subject to any disclaimer, the term of this patent is extended or adjusted under 35 U.S.C. 154(b) by 112 days.

(21) Appl. No.: 16/437,401

(22) Filed: Jun. 11, 2019

(65) Prior Publication Data
US 2019/0377981 A1 Dec. 12, 2019

Related U.S. Application Data

(60) Provisional application No. 62/683,184, filed on Jun. 11, 2018.

(51) Int. Cl.
*G06T 17/20* (2006.01)
*G06F 18/214* (2023.01)
(Continued)

(52) U.S. Cl.
CPC .......... *G06T 17/20* (2013.01); *G06F 18/2148* (2023.01); *G06F 18/40* (2023.01);
(Continued)

(58) Field of Classification Search
CPC .... G06K 9/6257; G06K 9/6253; G06K 9/726; G06T 15/04; G06T 15/20; G06T 17/05; G06T 17/20; G06T 2210/12
See application file for complete search history.

(56) References Cited

U.S. PATENT DOCUMENTS 6,622,085 B1 * 9/2003 Amita .................... G01C 21/32
340/990
2006/0170693 A1 * 8/2006 Bethune ................... G06T 3/40
345/568
(Continued)

OTHER PUBLICATIONS

International Search Report of the International Searching Authority dated Feb. 6, 2020, issued in connection with International Application No. PCT/IB2019/00750 (3 pages).
(Continued)

*Primary Examiner* — Abderrahim Merouan
(74) *Attorney, Agent, or Firm* — McCarter & English, LLP

(57) ABSTRACT

Systems and methods for generating simulated scenes from open map data for machine learning are presented. The system includes an automatic scene generative pipeline that uses freely-available map information and random texture maps to create large-scale 3D urban scene layouts for supervised learning methods. The system generates synthetic datasets that have improved generalization capabilities with respect to a given target domain of interest using data from open maps and texture map from the same geographic locations. Data from the generation pipeline of the system improves a model's generalization to real image sets beyond arbitrarily-simulated sets or labeled real data from other geographical regions.

25 Claims, 18 Drawing Sheets

(51) Int. Cl.
  *G06F 18/40*  (2023.01)
  *G06T 15/04*  (2011.01)
  *G06T 15/20*  (2011.01)
  *G06T 17/05*  (2011.01)
  *G06V 30/262*  (2022.01)

(52) U.S. Cl.
  CPC .............. *G06T 15/04* (2013.01); *G06T 15/20* (2013.01); *G06T 17/05* (2013.01); *G06V 30/274* (2022.01); *G06T 2210/12* (2013.01)

(56) References Cited

U.S. PATENT DOCUMENTS

| | | | |
|---|---|---|---|
| 2007/0014488 A1* | 1/2007 | Chen .................... | G06K 9/0063 382/294 |
| 2008/0215390 A1* | 9/2008 | Gipps .............. | G06Q 10/0631 705/7.26 |
| 2010/0197318 A1* | 8/2010 | Petersen ............... | H04W 4/029 455/456.1 |
| 2011/0034176 A1* | 2/2011 | Lord .................. | G06K 9/00993 455/450 |
| 2012/0271483 A1* | 10/2012 | Samukawa ........... | B60W 50/14 701/1 |
| 2013/0027555 A1* | 1/2013 | Meadow ........................ | 348/144 |
| 2014/0068439 A1* | 3/2014 | Lacaze ................ | G06F 3/04855 715/720 |
| 2014/0278847 A1* | 9/2014 | Gallo ................. | G06Q 30/0252 705/14.5 |
| 2015/0278298 A1* | 10/2015 | Boldyrev ........... | G01C 21/3647 707/754 |
| 2015/0325048 A1* | 11/2015 | Engle ..................... | G06T 15/50 345/632 |
| 2016/0026879 A1* | 1/2016 | Maeda ............... | G06K 9/00798 382/104 |
| 2016/0283516 A1* | 9/2016 | Barnes .................... | G06F 16/29 |
| 2017/0039765 A1* | 2/2017 | Zhou ..................... | G06T 19/006 |
| 2017/0053538 A1 | 2/2017 | Samarasekera et al. | |
| 2018/0045519 A1 | 2/2018 | Ghadiok et al. | |
| 2018/0144555 A1 | 5/2018 | Ford et al. | |
| 2018/0181817 A1* | 6/2018 | Yan .......................... | G06N 3/02 |
| 2018/0205471 A1* | 7/2018 | Goodbody ............. | H04W 16/22 |
| 2019/0110038 A1* | 4/2019 | DiVerdi ............ | G02B 27/0172 |
| 2019/0228571 A1* | 7/2019 | Atsmon ................. | G01C 11/04 |
| 2019/0251192 A1* | 8/2019 | Govindaraj ......... | G06F 16/5846 |
| 2020/0356901 A1* | 11/2020 | Zarandioon ............ | G06N 20/00 |

OTHER PUBLICATIONS

Written Opinion of the International Searching Authority dated Feb. 6, 2020, issued in connection with International Application No. PCT/IB2019/00750 (5 pages).

Ajakan, et al., "Domain-Adversarial Neural Networks," arXiv:1412.4446v1, Dec. 15, 2014 (7 pages).

Aubry, et al., "Understanding Deep Features with Computer-Generated Imagery," In Proceedings of the IEEE International Conference on Computer Vision (2015) (9 pages).

Badrinarayanan, et al., "Segnet: A Deep Convolutional Encoder-Decoder Architecture for Image Segmentation," arXiv:1511.00561v3, Oct. 10, 2016 (14 pages).

Bileschi, "StreetScenes: Towards Scene Understanding in Still Images," Technical Report, Massachusetts Institute of Technology, May 2006 (183 pages).

Bousmalis, et al., "Unsupervised Pixel-Level Domain Adaptation with Generative Adversarial Networks," arXiv:1612.05424v1, Dec. 16, 2016 (15 pages).

Cordts, et al., "The Cityscapes Dataset for Semantic Urban Scene Understanding," In Proceedings of the IEEE Conference on Computer Vision and Pattern Recognition (2016) (11 pages).

Roberto de Souza, et al., "Procedural Generation of Videos to Train Deep Action Recognition Networks," arXiv:1612.00881v1, Dec. 2, 2016 (18 pages).

Floros, et al., "OpenStreetSLAM: Global Vehicle Localization Using OpenStreetMaps," 2013 IEEE International Conference on Robotics and Automation (ICRA), May 6-10, 2013 (6 pages).

Gaidon, et al., "Virtual Worlds as Proxy for Multi-Object Tracking Analysis," In Proceedings of the IEEE Conference on Computer Vision and Pattern Recognition (2016) (10 pages).

Ganin, et al., "Unsupervised Domain Adaptation by Backpropagation," In International Conference on Machine Learning (2015) (12 pages).

Ganin, et al., "Domain-Adversarial Training of Neural Networks," Journal of Machine Learning Research (2016) (35 pages).

Geiger, et al., "Are We Ready for Autonomous Driving? The KITTI Vision Benchmark Suite," 2012 IEEE Conference on Computer Vision and Pattern Recognition (8 pages).

Handa, et al., "SceneNet: Understanding Real World Indoor Scenes with Synthetic Data," arXiv:1511.07041v2, Nov. 26, 2015 (12 pages).

Hentschel, et al., "Autonomous Robot Navigation Based on OpenStreetMap Geodata," 2010 13th International IEEE Conference on Intelligent Transportation Systems, Sep. 19-22, 2010 (6 pages).

Juhasz, et al., "User Contribution Patterns and Completeness Evaluation of Mapillary, a Crowdsourced Street Level Photo Service," Transactions in GIS (2016) (23 pages).

Kaneva, et al., "Evaluation of Image Features Using a Photorealistic Virtual World," 2011 IEEE International Conference on Computer Vision (ICCV) (8 pages).

La, et al., "Autonomous Robotic System for Bridge Deck Data Collection and Analysis," 2014 IEEE/RSJ International Conference on Intelligent Robots and Systems (IROS 2014) (6 pages).

Maggiori, et al., "Can Semantic Labeling Methods Generalize to Any City? The Inria Aerial Image Labeling Benchmark," IEEE 2017 (4 pages).

Mattyus, et al., "Enhancing Road Maps by Parsing Aerial Images Around the World," In Proceedings of the IEEE International Conference on Computer Vision (2015) (9 pages).

Merrell, et al., "Interactive Furniture Layout Using Interior Design Guidelines," In ACM Transactions on Graphics, vol. 30, No. 4, Jul. 2011 (10 pages).

Richter, et al., "Playing for Data: Ground Truth from Computer Games," In European Conference on Computer Vision, Springer, 2016 (17 pages).

Ros, et al., "The SYNTHIA Dataset: A Large Collection of Synthetic Images for Semantic Segmentation of Urban Scenes," In Proceedings of the IEEE Conference on Computer Vision and Pattern Recognition (2016) (10 pages).

Shrivastava, et al., "Learning from Simulated and Unsupervised Images Through Adversarial Training," arXiv:1612.07828v2, Jul. 19, 2017 (16 pages).

Tzeng, et al., "Adversarial Discriminative Domain Adaptation," arXiv:1702.05464v1, Feb. 17, 2017 (10 pages).

Veeravasarapu, et al., "Adversarially Tuned Scene Generation," arXiv:1701.00405v2, Jul. 7, 2017 (9 pages).

Veeravasarapu, et al., "Model-Driven Simulations for Computer Vision," 2017 IEEE Winter Conference on Applications of Computer Vision (9 pages).

Wang, et al., "Holistic 3D Sscene Understanding from a Single Geo-tagged Image," In Proceedings of the IEEE Conference on Computer Vision and Pattern Recognition (2015) (9 pages).

Yu, et al., "Make it Home: Automatic Optimization of Furniture Arrangemen," ACM Transaction on Graphics, vol. 30, No. 4, Jul. 2011 (12 pages).

Zhang, et al., "Physically-Based Rendering for Indoor Scene Understanding Using Convolutional Neural Networks," arXiv:1612.07429v3, Jul. 2, 2017 (9 pages).

Zhu, et al., "Unpaired Image-to-Image Translation Using Cycle-Consistent Adversarial Networks," arXiv:1703.10593v3, Nov. 24, 2017 (20 pages).

* cited by examiner (g) An image from Camera 1

(h) An image from Camera 2

(i) An image from Camera 3

(j) An image from Camera 4

(k) An image from Aerial cam (a)
(b)
(c)
(d)

(l) Labels from Camera 1

(m) Labels from Camera 2

(p) Labels for aerial view (o) Labels from Camera 4

(n) Labels from Camera 3

FIG. 16

| Train set | Test set | Building | Road | Poser | Tree | Sidewalk | Vehicle | Ground | Sky | mix |
|---|---|---|---|---|---|---|---|---|---|---|
| CS_train | real_FF_test | 74 | 83 | 78 | 72 | 73 | 57 | 53 | 91 | 72 |
| CS_train | virtual_FF | 69 | 67 | 82 | 68 | 70 | 68 | 47 | 84 | 72 |
| CS_train | arb_SIM | 57 | 62 | 67 | 75 | 55 | 49 | 59 | 86 | 38 |
| CS_train | virtual_FF_fog | 58 | 57 | 52 | 46 | 46 | 49 | 49 | 82 | 56 |
| virtual_FF | real_FF_test | 63 | 72 | 68 | 58 | 67 | 28 | 57 | 88 | 68 |
| arb_SIM | real_FF_test | 62 | 69 | 59 | 59 | 65 | 68 | 58 | 81 | 56 |
| CBCL | real_FF_test | 53 | 68 | 63 | 61 | 32 | 68 | 26 | 86 | 57 |
| virtual_FF+real_FF_dev | real_FF_test | 78 | 77 | 72 | 83 | 63 | 74 | 83 | 87 | 72 |
| arb_SIM+real_FF_dev | real_FF_test | 65 | 63 | 57 | 61 | 53 | 54 | 73 | 89 | 66 |
| CBCL+real_FF_dev | real_FF_test | 67 | 88 | 63 | 79 | 45 | 68 | 60 | 81 | 58 |

SYSTEM AND METHOD FOR GENERATING SIMULATED SCENES FROM OPEN MAP DATA FOR MACHINE LEARNING

RELATED APPLICATIONS

The present application claims the benefit of U.S. Provisional Application Ser. No. 62/683,184 filed on Jun. 11, 2018, the entire disclosure of which is expressly incorporated by reference.

BACKGROUND

Technical Field

The present disclosure relates generally to the field of computer vision. More particularly, the present disclosure relates to systems and methods for generating simulated scenes from open map data for machine learning.

Related Art

Data generated from computer graphics can be used to train and validate computer vision systems, especially in situations where high-quality, real-world annotated data is difficult to acquire. Example applications include semantic segmentation and optical flow, which require pixel-level annotations on large-scale image sets. However, simulations on large scales (especially, for outdoor scenes) require a large amount of time and effort to design three-dimensional (3D) scene states.

Moreover, simulating without target domain knowledge can have domain-shift issues. Domain shift of virtual worlds can be caused by two factors: (a) statistical deviation of 3D scene states from reality, and (b) the level of approximations in a rendering process compared to a real image acquisition process in a target application. Prior art systems relating to domain adaptation attempt to mitigate the issue of domain shift, but the generalization of these methods underperform with respect to models trained on limited amounts of labeled real data from the target domain. Accordingly, guiding scene generation processes or virtual scene parameters with data from the target domain-of-interest (to create virtual scenes similar to real scenes) is a long-standing goal for computer vision systems in order to simulate the data for training or validation.

Moreover, some prior art systems attempt to quantify the role of rendering engines and their approximations towards domain shift, and these systems attempt to demonstrate improved generalization when physically-realistic renderers are used. However, due to lack of flexibility in scene simulation platforms, there is a lack of adequate systems which address or study the impact of 3D scene generators on domain-shift.

Although large volumes of data are available, aerial image understanding is hindered due to the lack of large-scale training sets with high quality annotations. Manual annotation is laborious and erroneous. Synthesizing the annotated data is an alternative to cumbersome task of manual annotation. However, simulating the data with aerial views requires creation of large scale 3D environments. With respect to datasets that are publicly available, the 3D scene states used for rendering are not open to the public. Hence, it is not possible to do further tweaking with the scene parameters. Some prior art systems have demonstrated utilizing a video game engine to generate data by intercepting the communication between the game and the graphics hardware. However, the label generation part is not completely automated. Moreover, it is not trivial to alter camera, light, or rendering processes due to lack of access to low-level constructs in the scene. Accordingly, a data generation process which is fully automated is needed and which can provide full control over scene parameters (if desired) and access to per-pixel groundtruth information such semantic labels, etc.

With respect to stochastic scene generation processes, some prior art systems for 3D layout synthesis have attempted to optimize furniture arrangement based on layout constraints (e.g, support relations, bounding-box overlap, pairwise distances and visibility, etc.). Moreover, some prior art systems introduced large scale simulated data for indoor scene understanding and a stochastic scene generation model for traffic scenes based on marked point fields coupled with factor potentials. These systems' virtual scene generation model use base stochastic scene generation processes. Similarly, some prior art systems proposed a stochastic scene generation model for traffic scenes based on marked point fields coupled with factor potentials. These virtual scene generation models can use a base road layout and pre-drawn loaded 3D computer-aided design (CAD) and texture models for objects like buildings, vehicles, etc. However, the prior art systems' data generation process does not utilize any target domain knowledge. Hence, the prior art systems attempt to correct the domain shift of their simulated data by adding a few labeled samples from target domain in the training process. Accordingly, a need exists for a way to use similar layout geometry and texture models (from the target domain-of-interest) to reduce the domain shift in the simulation phase itself.

With respect to domain adaptation, the advent of adversarial training concepts has led to several prior art methods to adapt labeled virtual data (source domain) to unlabeled real world data (target domain). Some prior art systems aim to learn domain-invariant but task-reliable features in end-to-end trainable frameworks in an adversarial manner. These prior art systems have networks which have a first few layers which are shared by two classifiers: a domain classifier and a task-related classifier. Training has been done in a "min-max" optimization fashion to minimize task specific loss and maximize domain-classification loss. Some prior art systems try to refine/transform the source images to look as if they were drawn from the target domain by preserving the ground truth of source images. However, training procedures for these architectures are unstable and the learned features or representations may not be transferable across tasks.

With respect to simulating with target domain models, some prior art systems attempt to demonstrate the large amounts of simulated data, but there is still a large mismatch in statistics of the data between simulated data and real data. This is largely due to the use of gaming environments or manually-designed city models. Some prior art systems attempt to use a virtual cloning method to match virtual object (vehicles and roads) geometry to that of real data in a semi-automated manner using annotated data (3D boxes on point clouds and camera GPS). But these prior art systems are unsatisfactory, and accordingly, there exists a need to leverage auxiliary information sources with geometry and texture data that is more close to the target domain. There also exists a need to develop a fully automated, and scalable scheme for effective reduction of domain-shift.

Therefore, what would be desirable is a scalable stochastic scene generative processes to generate 3D scene states automatically with sufficient diversity and also with less domain-shift to target real-world application domains.

Accordingly, the systems and methods of the present disclosure address these and other needs.

SUMMARY

The present disclosure relates to systems and methods for generating simulated scenes from open map data for machine learning. The system includes an automatic scene generative pipeline that uses freely-available map information and random texture maps to create large-scale 3D urban scene layouts. The system demonstrates the utility of synthesizing training data for supervised learning methods for urban scene semantic segmentation and aerial image labeling. The system generates synthetic datasets that have improved generalization capabilities with respect to a given target domain of interest. The system does this by using data from open maps and texture map from the same geographic locations. Data from the generation pipeline of the system improves a model's generalization to real image sets beyond arbitrarily-simulated sets (for instance, data from video-games) or labeled real data from other geographical regions (such as data from other cities/countries). Moreover, the system demonstrates the utility of using simulated data with varied aerial views and detailed semantic labels.

BRIEF DESCRIPTION OF THE DRAWINGS

The foregoing features of the invention will be apparent from the following Detailed Description, taken in connection with the accompanying drawings, in which:

FIG. 16 list information about datasets can be used in the system of the present disclosure;

DETAILED DESCRIPTION

The present disclosure relates to systems and methods for generating simulating scenes from open map data for machine learning, as discussed in detail below in connection with FIGS. 1-18.

Figure 1:
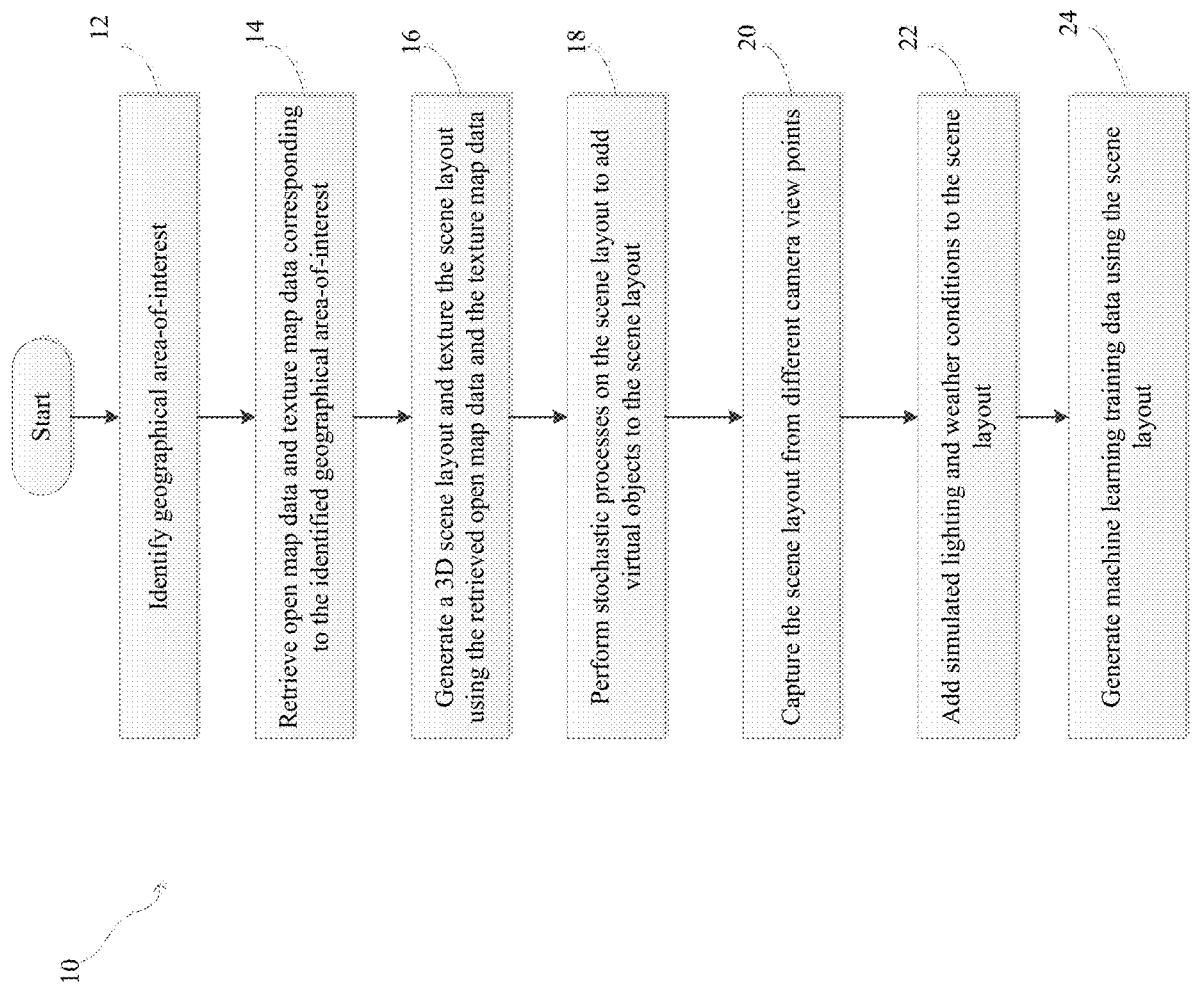
FIG. 1 is a flowchart illustrating processing steps carried out by the system of the present disclosure.

FIG. 1 is a flowchart showing processing steps 10 carried out by the system of the present disclosure. Beginning in step 12, the system can identify a geographical area of interest. In step 14, the system can retrieve open map data and texture map data corresponding to the identified geographical area of interest. In step 16, the system can generate a 3D scene layout and texture the scene layout using the retrieved open map data and the texture map data. In step 18, the system can perform stochastic processes on the scene layout to add virtual objects to the scene layout. In step 20, the system can capture the scene layout from different camera view points. In step 22, the system can add simulated lighting and weather conditions to the scene layout. In step 24, the system can generate machine learning training data using the scene layout. The machine learning training data can then be used to train computer systems (e.g., convolutional neural networks, etc.) to perform future computer vision tasks.

Figure 2:
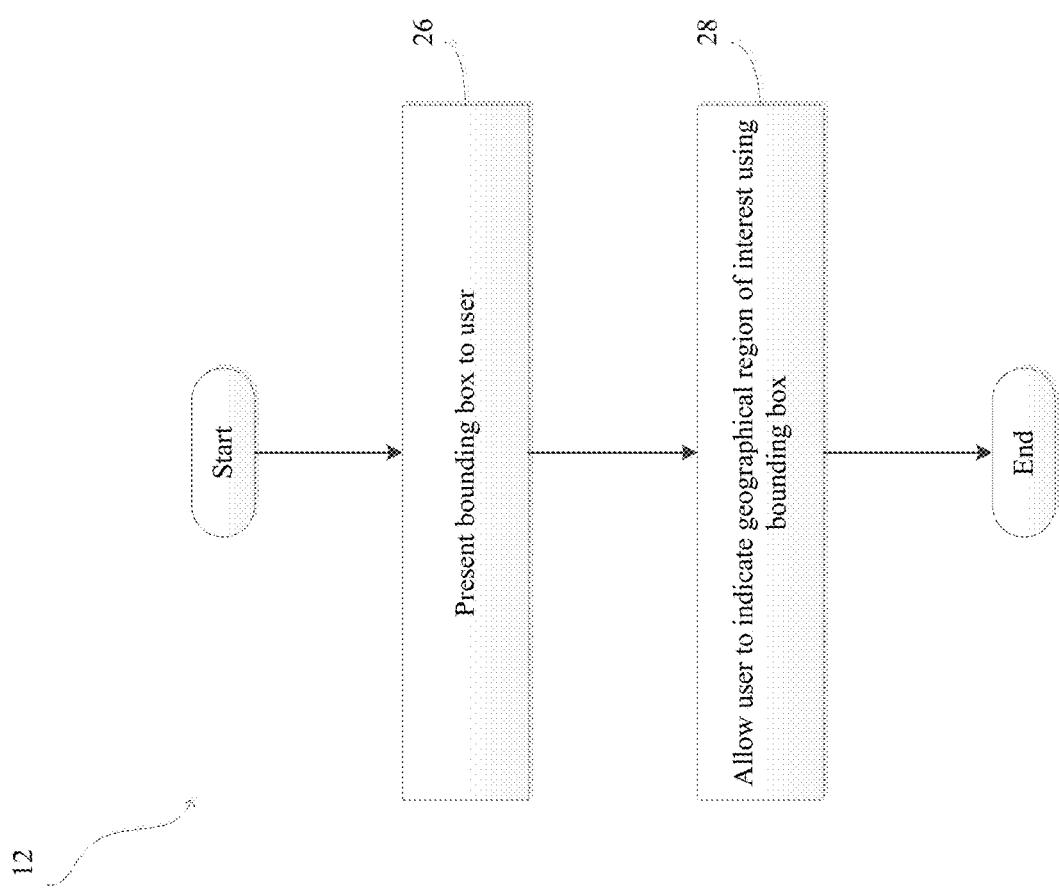
FIG. 2 is a flowchart illustrating processing steps for identifying a geographical area-of-interest.

FIG. 2 is a flowchart illustrating step 12 of FIG. 1 in greater detail, wherein a user can identify a geographical area-of-interest. In step 26, the system can present a user with a bounding box and in step 28, the system can allow the user to indicate a geographical area of interest using the bounding box provided in step 26. Any other suitable way of identifying a geographical region of interest could also be carried out, e.g., by specifying a street address, geographical coordinates (e.g., GPS coordinates, latitude and longitude coordinates, etc.), screen (pixel) coordinates, or any other suitable way.

Figure 3A:
FIGS. 3A-3B are drawings illustrating maps that can be used by the system of the present disclosure.
Figure 3B:
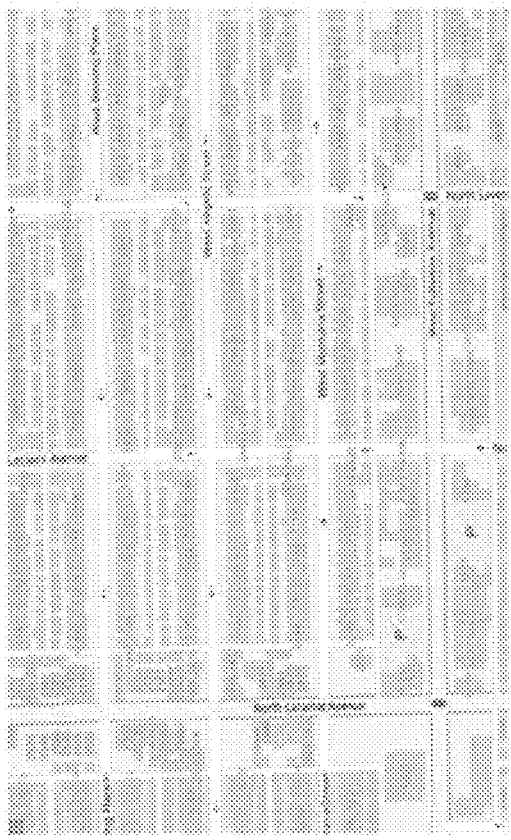

FIGS. 3A and 3B are examples of maps that can be used in step 12 of FIGS. 1 and 2. Open maps such as "OpenStreetMaps" (hereinafter "OSM") are digital maps that can provide rich information about scene layout footprints. OSM is a collaborative project to create high quality maps about geographical information throughout the world. OSM can store the maps data in XML format that can be accessed freely. The system of the present disclosure is not limited to XML format, and any suitable format can be used. Given a bounding box (e.g., in GPS coordinates), the system of the present disclosure can retrieve the geographical information of the area (e.g., city or street) covered by the box. The information about object footprints (building, roads, parks, lands/grounds, and water bodies, etc.) can be represented by "nodes" (polygons with geographic points, stored as coordinate pairs of latitude and longitude) and "ways" (ordered lists of nodes, representing a polyline, or possibly a polygon if the polylines form a closed loop). As shown in FIGS. 3A and 3B, these features can be used both for representing features such as streets and rivers, as well as areas such as forests, parks, parking areas, and lakes. The present disclosure is not limited to OSM and can process other datasets consistent with the spirit of the present disclosure.

Figure 4:
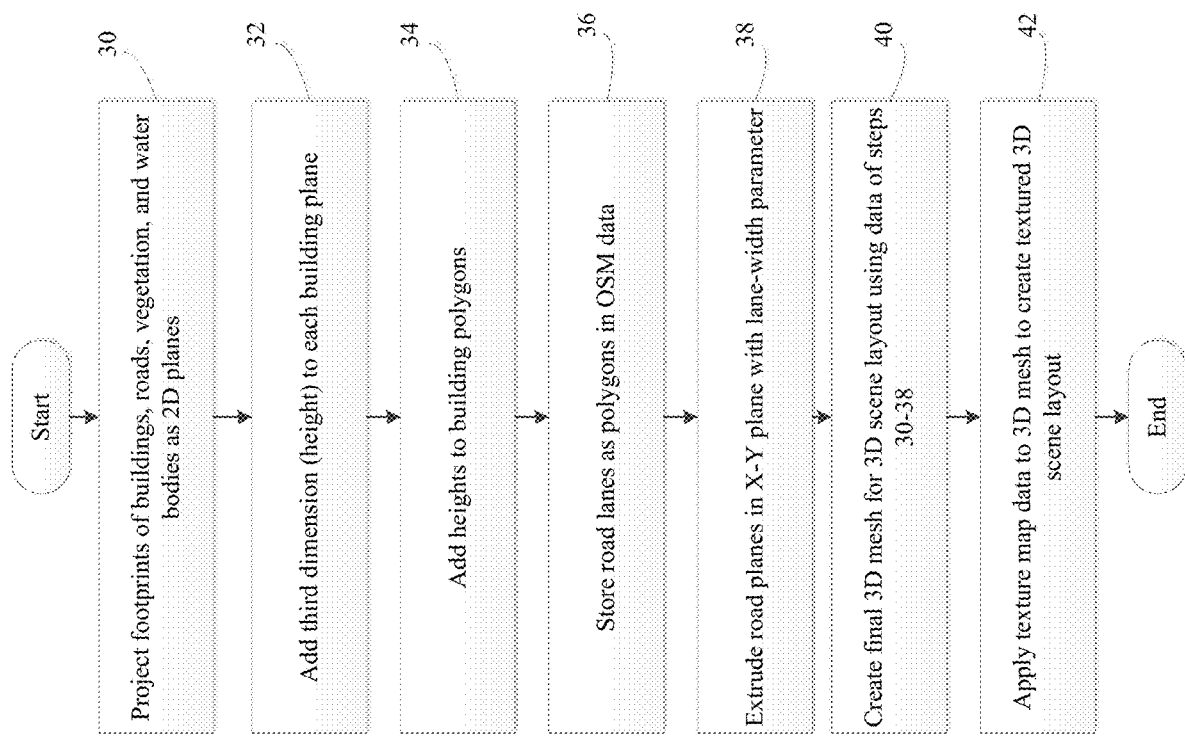
FIG. 4 is a flowchart illustrating processing steps for generating a 3D scene layout and texturing the scene layout.

FIG. 4 is a flowchart illustrating step 16 of FIG. 1 in greater detail. In step 16, the system generates a 3D scene layout and textures the scene layout. In step 30, the system projects footprints of buildings, roads, vegetation, and water bodies as 2D planes. In step 32, the system adds a third dimension (e.g., height) to each building plane. In step 34, the system adds heights to the building polygons. In step 36, the system stores road lanes as polygons in the OSM data. In step 38, the system extrudes road planes in the X-Y plane with a lane-width parameter. In step 40, the system creates a 3D mesh for a 3D scene layout using the data from steps 30-38. In step 42, the system applies texture map data to the 3D mesh to create a textured 3D scene layout.

Figure 5A:
FIG. 5A is a drawing illustrating a two-dimensional (2D) scene layout from open street maps data.

FIG. 5A illustrates a 2D scene layout generated from open street maps data as discussed above in step 30 of FIG. 4. As can be seen, the system can project footprints of objects as 2D planes. In particular, vegetation can include, but is not limited to, parks and forests. Moreover, water bodies can include, but is not limited to, rivers and lakes.

Figure 5B:
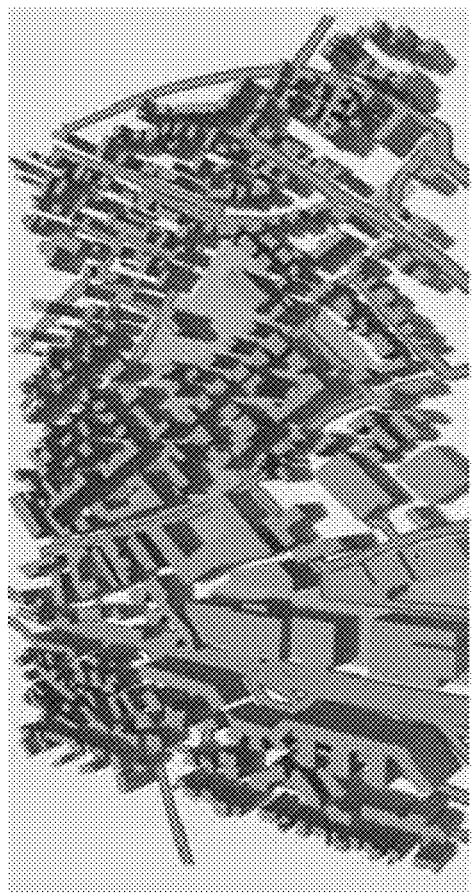
FIG. 5B is a drawing illustrating a 3D scene layout generated from the 2D scene layout in FIG. 5A.

FIG. 5B illustrates a 3D scene layout generated from the 2D scene layout shown in FIG. 5A. FIG. 5B is an example output from steps 32-40 of FIG. 4. As can be seen, a third dimension (e.g., heights of buildings) can be added to each building plane separately. For building polygons, heights (z-dimension) can be randomly sampled from a Gaussian distribution with an example mean of 50 meters and standard deviation 5 meters. Road lanes can be stored as polylines in OSM data, but the present disclosure is not limited as such. The road planes can be extruded in a xy-plane with an example lane-width parameter of 3 meters. An example resulting 3D mesh can be seen in FIG. 5B.

Figure 6A:
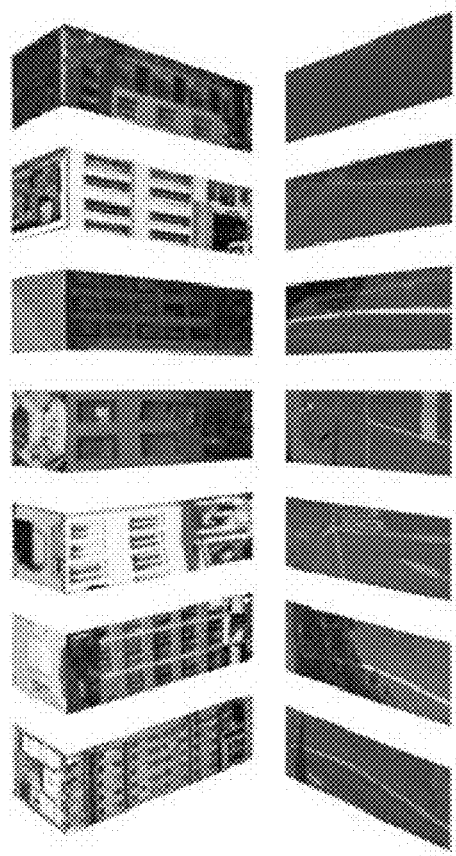
FIG. 6A is a drawing illustrating of an example of a textured map that can be used by the system of the present disclosure.
Figure 6B:
FIG. 6B is a drawing of a textured scene generated from the textured map of FIG. 6A.

Referring back to FIG. 4 with respect to step 42, as well as with reference to FIGS. 6A-6B, the process of creating a textured 3D scene layout as shown in FIG. 6B will now be discussed in greater detail. As can be seen in FIG. 6A, the system of the present disclosure first creates a set of texture maps reflecting the target domain. In particular, to create simulated data to be generalizable to real traffic scene images, the system can create texture-maps for building facades and road-lanes from image data that is captured. The system can also use building texture-maps which are available in "sketchup" 3D CAD models by GOOGLE, INC. The present disclosure is not limited to using sketchup 3D CAD models. Moreover, the system can use the INRIA aerial image dataset to create texture-maps for rooftops/terrace planes, as some models which can be trained can segment real buildings from an aerial view. For a given database having images of a scene (e.g., CityScapes for Frankfurt), the system can select a subset (e.g., 67 out of 267). For the subset of images, the system can extract texture maps by using the other 200 images for other purposes as will be explained in greater detail below. With help of ground truth masks provided with the subset images, the system can sample several bounding boxes on an image plane from building facade (or road segment) orientation and location for a given camera matrix. If the bounding box completely falls inside a building region (or road segment), the system can crop out the image region and store it as a texture map for the corresponding object (building facade or road segment). Alternatively, the system can use computer vision algorithms (for facade/road segmentation) to retrieve the masks in the event ground truth masks are not available. The system can manually inspect a created texture repository and discard unrealistic ones. The system can then use a plurality of texture-maps (e.g., 300 for the example above) in the simulation process for both facade and road segment classes. Similarly, rooftop texture maps can be created from six high-resolution images in a dataset (e.g., INRIA dataset for Chicago, which can give approximately 100 texture-maps for rooftops). As noted above, texture map examples can be seen in FIG. 6A. For other objects like sidewalks, parks, etc., the system can use texture maps downloaded from various sources from the Internet as known to those of skill in the art. The result of the above processes can be seen as a textured 3D scene layout as shown in FIG. 6B.

Figure 7:
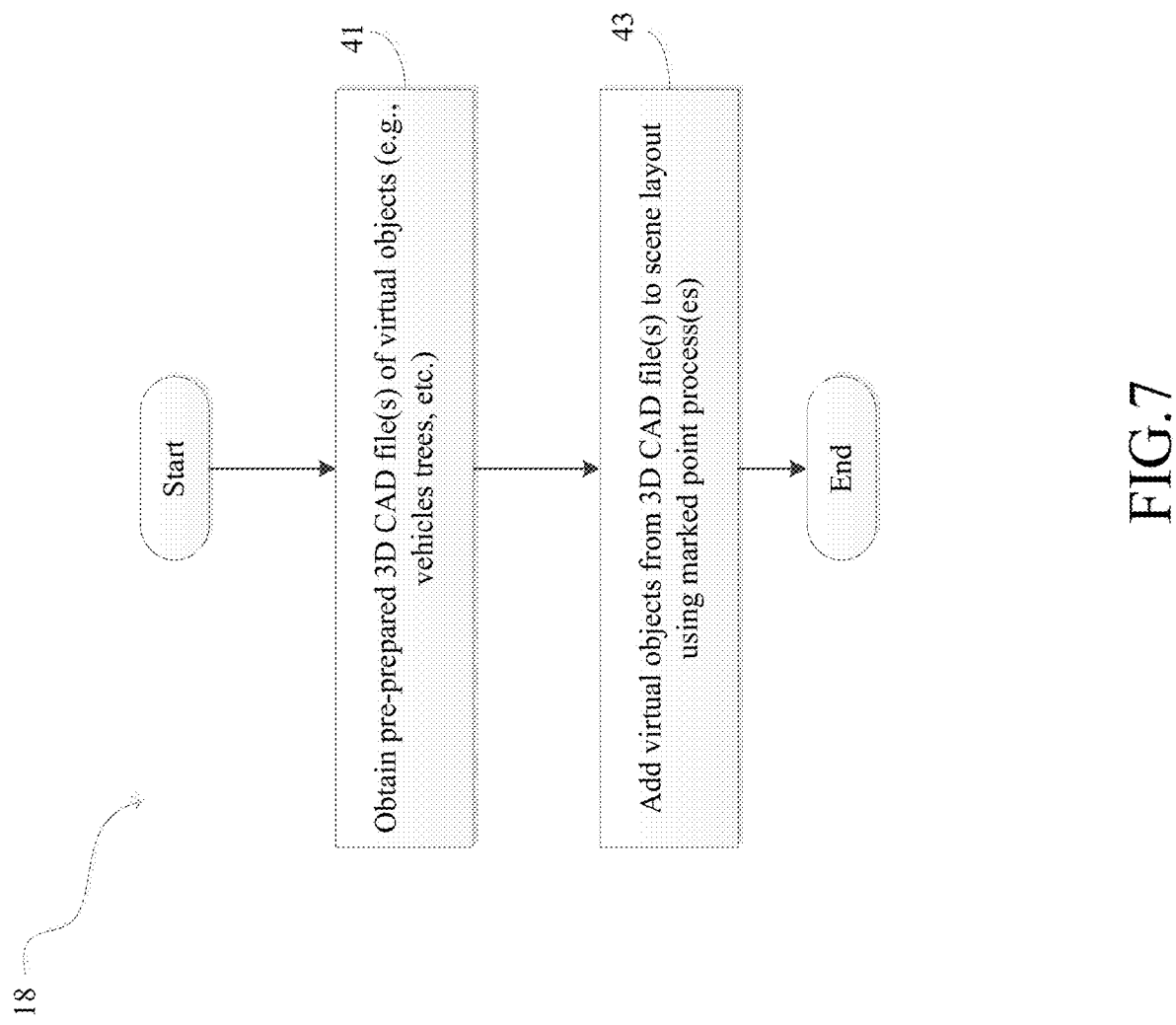
FIG. 7 is a flowchart illustrating processing steps for performing stochastic processes on a scene layout to add virtual objects to the scene layout.
Figure 8:
FIG. 8 is a drawing of a scene illustrating an example result generated by the process of FIG. 7.

FIG. 7 is a flowchart illustrating step 18 of FIG. 1 in greater detail. IN step 18, the system performs stochastic processes on a scene layout to add virtual objects to the scene layout. In step 41, the system retrieves pre-prepared 3D CAD file(s) of virtual objects such as vehicles or trees. Alternatively, the system can generate the virtual objects automatically without pre-prepared CAD files. In step 43, the system of the present disclosure can add virtual objects from the 3D CAD files to a scene layout using marked point process(es). As an open street map may not provide detailed information about objects like vehicles and trees, the system can use marked point processes coupled with pre-downloaded 3D CAD files to add such objects to the scene layout generated in the previous steps as discussed in detail above. To ensure that vehicle objects are mostly distributed on road regions and tree objects are distributed on ground (or other land area), the system can use a factor potential scheme. The orientation of a vehicle can be computed based on an orientation of a road lane that it the vehicle is placed on. An example result of this process can be seen in FIG. 8.

Figure 9:
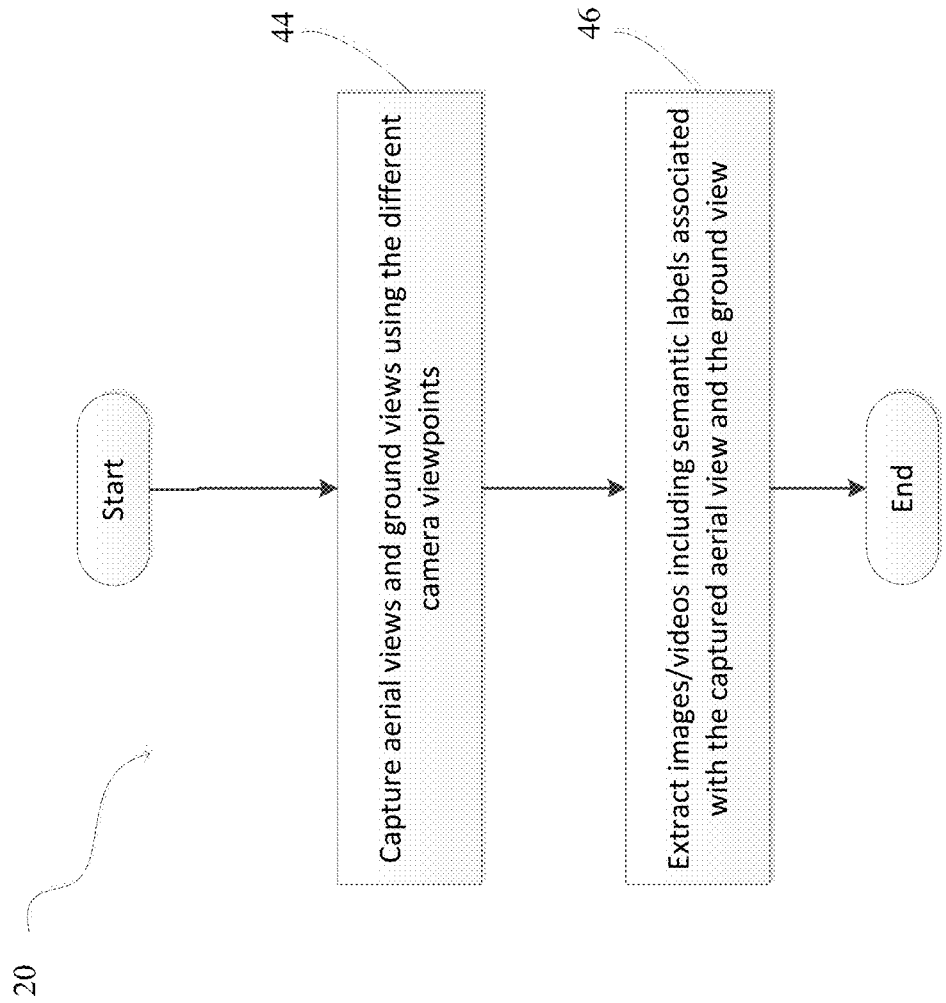
FIG. 9 is a flowchart illustrating processing steps for capturing a scene layout from different camera view points.

FIG. 9 is a flowchart illustrating step 20 of FIG. 1 in greater detail. In step 20, the system captures a scene layout from different camera view points. In step 44, the system of the present disclosure can capture aerial views and ground views using different camera view points. In step 46, the system can then extract images/videos including semantic labels associated with the captured aerial view and the ground view.

Figure 10:
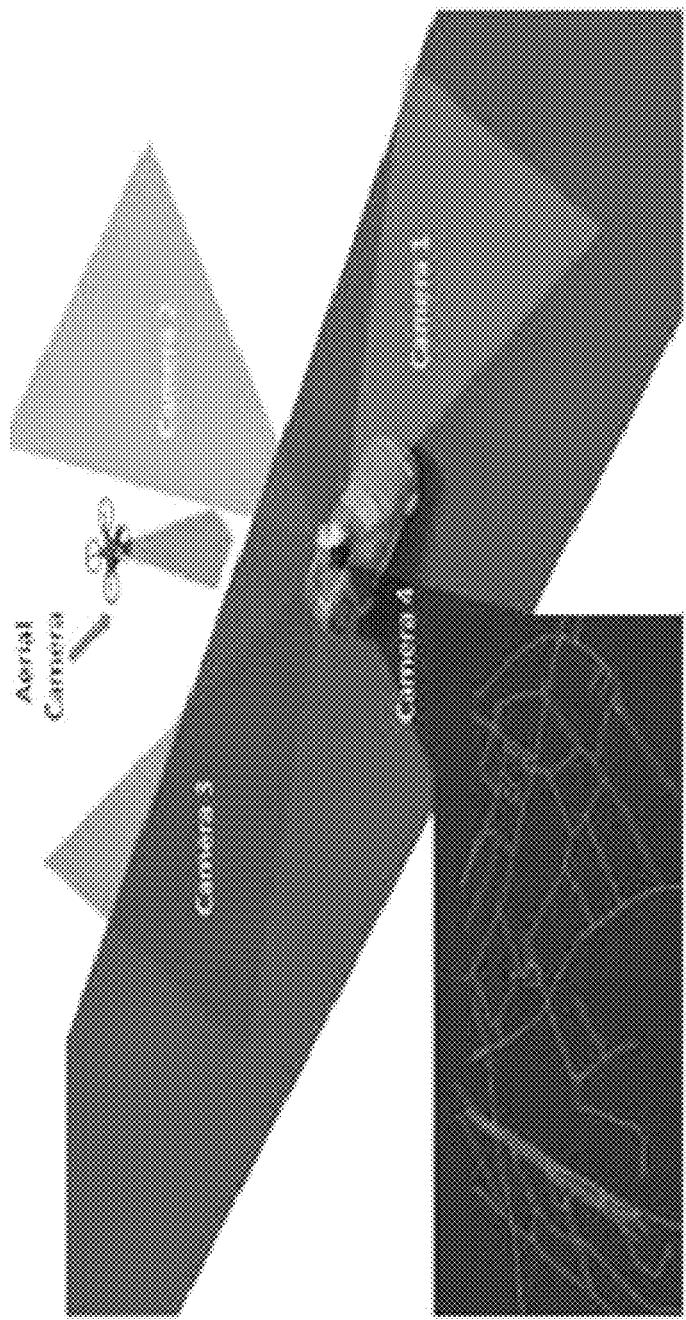
FIG. 10 is a drawing illustrating a multi-camera system for capturing a scene from different viewpoints.
Figure 11A:
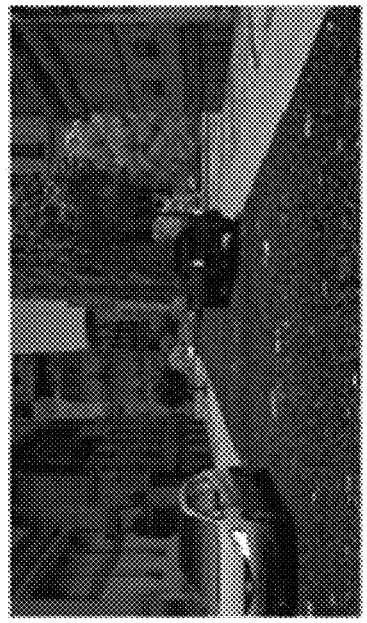
FIGS. 11A-11E are drawings illustrating images generated from the multi-camera system of FIG. 10.
Figure 11B:
Figure 11C:
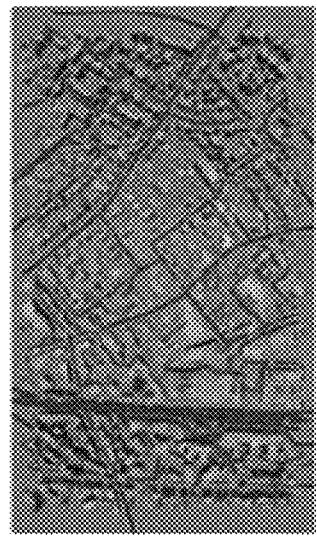
Figure 11D:
Figure 11E:
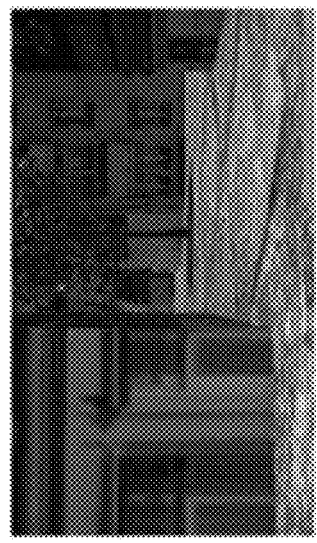

FIG. 10 is a drawing illustrating a multi-camera system for capturing a scene from different viewpoints, as discussed above in connection with FIG. 9. The system can use a multi-camera setup to capture the generated scene from different view points including ground-view and aerial view as shown in FIG. 10. Four ground cameras can be positioned at a height of an average human eye from the ground to cover frontal, rear, left and right side views as if they are seen from a moving car. The aerial view camera can be positioned at height of h~uniform (500,1500) meters above the ground and oriented to look down as if it is seen from an unmanned aerial vehicle. As can be seen in the bottom left portion of FIG. 10, this camera set up can be animated to follow a random polycurve sampled from in road data from the OSM. The intrinsics of the cameras can be set based on the target test dataset on which the system can evaluate the trained computer vision models. The system of the present disclosure is not limited to any setting of the camera. Since the present disclose can account for semantic segmentation from both aerial and ground view, the system can also render semantic labels along with images/videos which include object classes such as building, road, tree, low vegetation, ground, vehicle, sky, etc.

FIGS. 11A-11E are drawings illustrating images generated from the multi-camera setup of FIG. 10. In particular, the result of the above processes can produce a pair of image and labels for each camera is as can be seen in FIGS. 11A-11E.

Figure 12A:
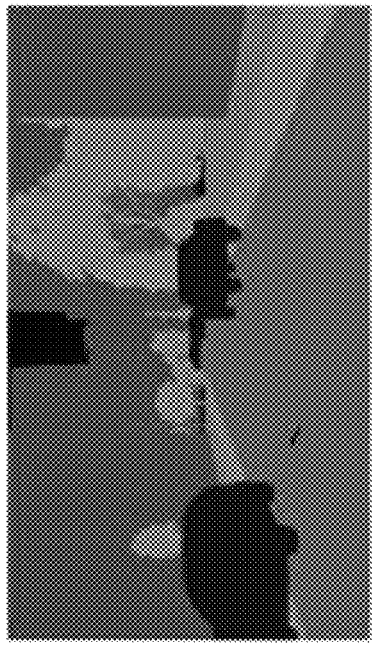
FIGS. 12A-12E are drawings illustrating images having labels representing elements within the images, generated by the multi-camera system of FIG. 10.
Figure 12B:
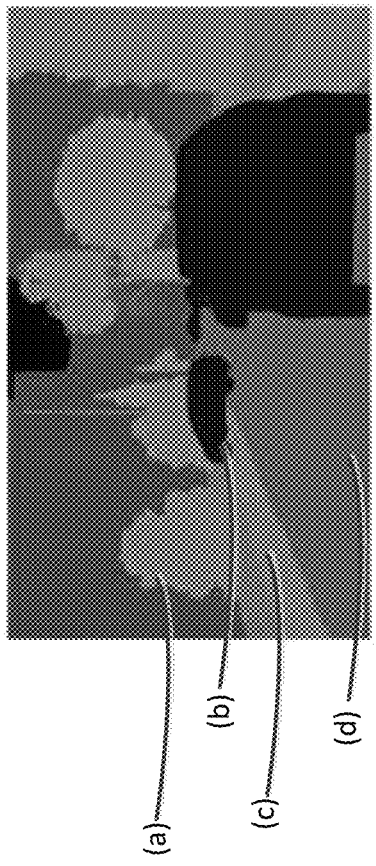
Figure 12E:
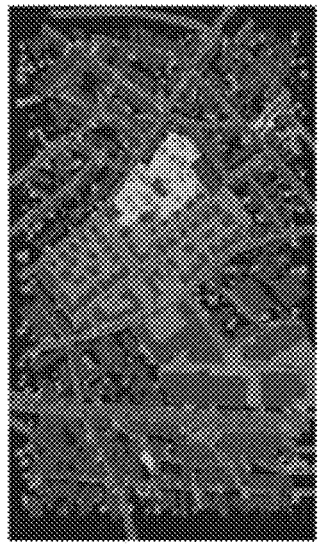
Figure 12D:
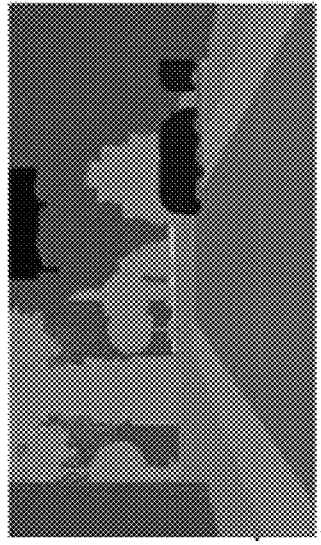
Figure 12C:

FIGS. 12A-12E are drawings illustrating images having labels representing elements within the images generated from the multi-camera setup of FIG. 10. To replicate correct outdoor lighting, the system can use an environmental lighting procedure that can use high definition spherical sky panoramas. The system can collect several high-definition (HD) sky textures for different lighting conditions (for instance, sunrise, noon, dawn etc.). In addition to sky lighting, the system can also use a shader of sun light with one or more parameters of position, orientation, color spectrum, intensity, etc. All parameters can be randomized or modified in one or more scripts. The orientation of light source can be set in the direction of a line connecting its position and ground level camera. Shaders of volume scatter and particle systems can be used to simulate the effects of static weather (fog, haze, mist, etc.) or dynamic weather (rain, snow, etc). However, the present disclosure can skip simulation of the effects of dynamic weather if desired. As can be seen in FIG. 12A, for example, trees can colored with a unique label as shown by reference label (a), cards can be colored with another label as shown by reference label (b), a curb can be colored with another label as shown by reference label (c), and a road can be colored with another label as shown by reference label (d).

Figure 13B:
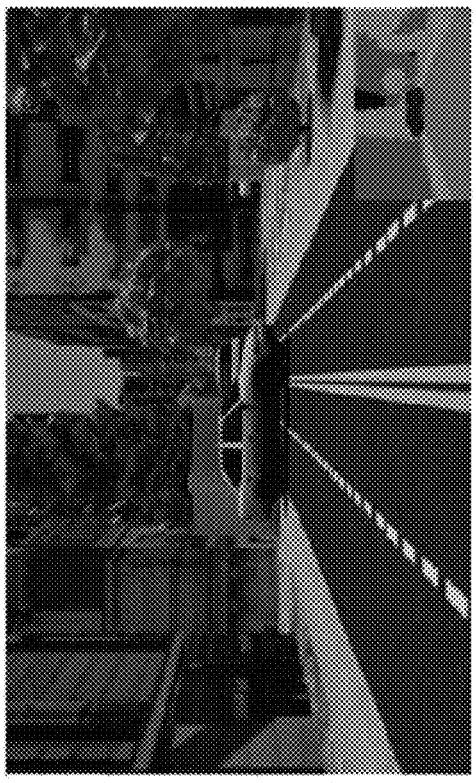
FIGS. 13A-D are drawings illustrating an aerial view of a scene and the corresponding ground view generated by the system of the present disclosure.
Figure 13A:
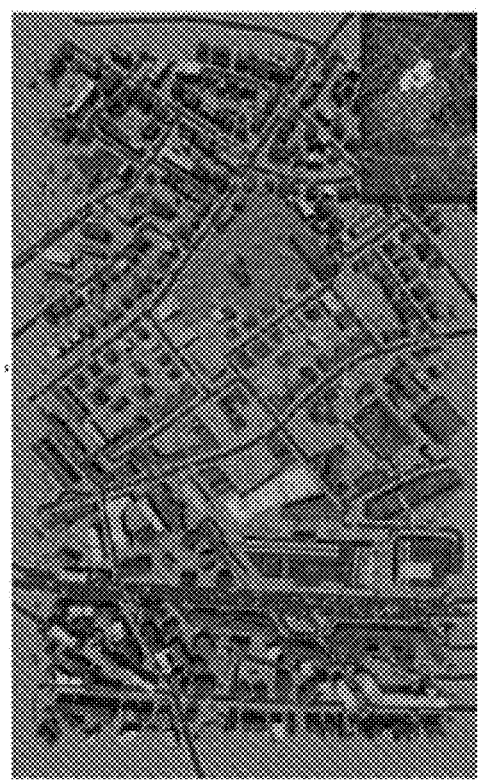
Figure 13D:
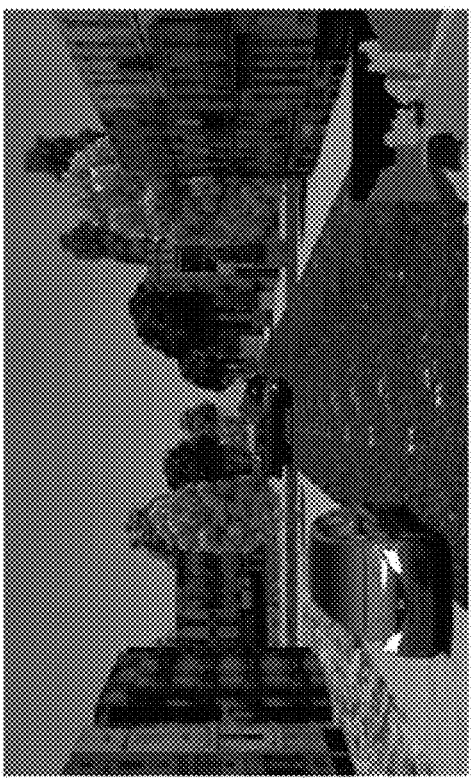
Figure 13C:
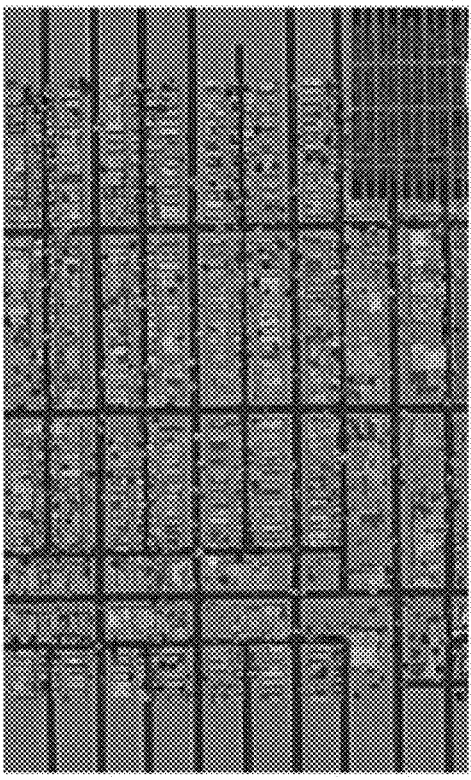

As discussed above, the system of the present disclosure can take a map of a region as shown in FIG. 3A and generate an aerial view of a 3D scene state as shown in FIG. 13A. The system can then convert the aerial view of the 3D scene state of FIG. 13A to a ground view image with semantic labels as shown in FIG. 13B. Similarly, the system can take a map of a region as shown in FIG. 3B and generate an aerial view of a 3D scene state as shown in FIG. 13C. The system can then convert the aerial view of the 3D scene state of FIG. 13C to a ground view image with semantic labels as shown in FIG. 13D.

The system can be implemented on an open source graphics engine such as "Blender" to implement the above processes. Models for light sources, materials and weather effects (and other models) can readily be available within it. Several rendering algorithms can be interfaced with Blender. An underlying python package, bpy, can enable integrating an ML package into Blender. This can allow reinforcement learning and probabilistic programming applications in the future. Alternatively, the system can generate a training set by leveraging the modern rendering engine of Blender. To generate corresponding semantic labels, the system can assign a unique ID for each object class and render an "Red Green Blue" or "RGB" image along with a label image with class IDs of building, roads, side-walks, vehicles, trees, ground and sky etc. Color codes for label visualizations can be adapted as known to those of skill in the art.

In addition to the scene generation tool discussed above, the system can also be used to generate training sets for computer vision tasks such as aerial image labeling and traffic scene semantic segmentation. The system can use, for example, SegNet architecture (for example 19 layers) with different training testing data combinations to quantify a virtual to reality gap. The system can use a fixed set of hyper-parameters (e.g., learning-rate=1e-4, max-iter=20000 SGD iterations, batch-size=4). The system can also use ImageNet pre-trained weights for initialization for training. The details of datasets used in these experiments can be seen in Table 1 below.

TABLE 1

The details of the datasets used in the experiments

| Data Set | # of Images | Geographical Remarks |
|---|---|---|
| Traffic scenes | | |
| CityScapes-train (CS-train) [6] | 3475 | Aachen, Bochum, Bremen, Cologne, Darmstadt, Zurich etc. |
| CityScapes-val (CS_val) [6] | 500 | Frankfurt, Lindau, Munster |
| CBCL-train [4] | 200 | Boston |
| reaLLFFTest [6] | 200 | 200 frankfurt images CS_val |
| real_FF_dev [6] | 67 | 67 frankfurt images CS_val |
| Virtual_FF (ours) | 5000 | Simulated from our tool using Frannkfurt info |
| arb_SIM [22] | 5000 | randomly selected from SYNTHIA [22] |
| Aerial Images | | |
| INRIATrain [18] | 144 | Austin, Vienna, West tyrol etc. |
| reaLCC_test [18] | 30 | Chicago |
| reaLCC-dev [18] | 6 | Chicago |
| virtuaLCC (ours) | 2500 | Simulated from our tool using Chicago info |

With respect to reference real datasets, the system can use CityScapes as it is one of the large-scale, real-world benchmark datasets for traffic scene semantic segmentation. The present disclosure is not limited to this dataset. This dataset can be divided into two splits: CityScapes-train and CityScapes-val sets. They include nearly 5,000 images that were captured in several European cities. CityScapes-val comes with 267 images from Frankfurt traffic scenes which can be used as target domain images. CBCL is another benchmark set for street scenes, recorded in and around Boston. It include of 200 images with manually labeled annotations. Similarly, the INRIA dataset is one of the benchmark datasets for the field of aerial image labeling. It provides 144 images (plus 36 Chicago images) in its train split with building and non-building labels. Since these images are of very high resolution (5,000×5,000), the system can randomly crop 500×500 images to prepare minibatches while training. The present disclosure is not limited to any particular dataset.

Figure 14:
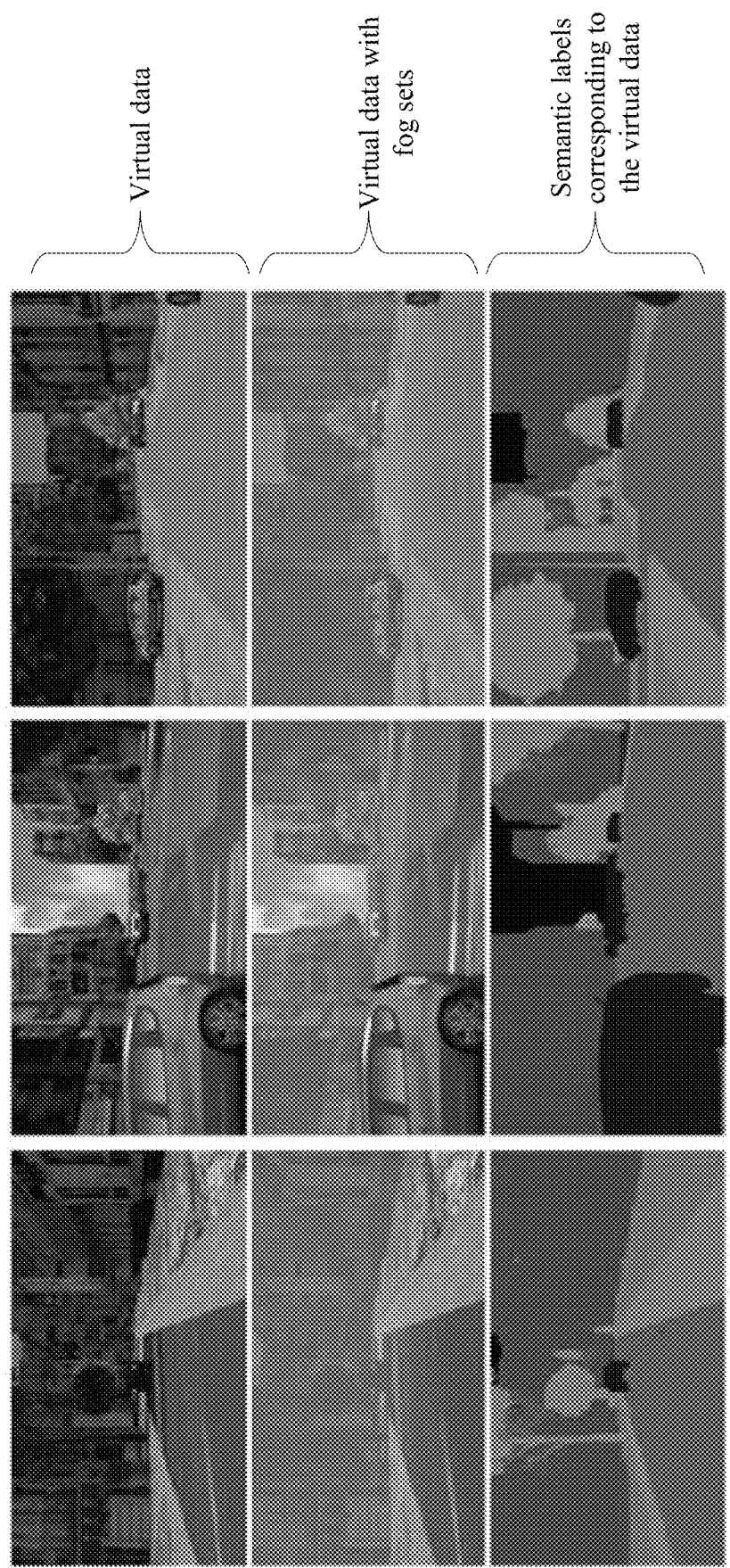
FIG. 14 illustrates drawings of sample images that can be generated by the system of the present disclosure.
Figure 15:
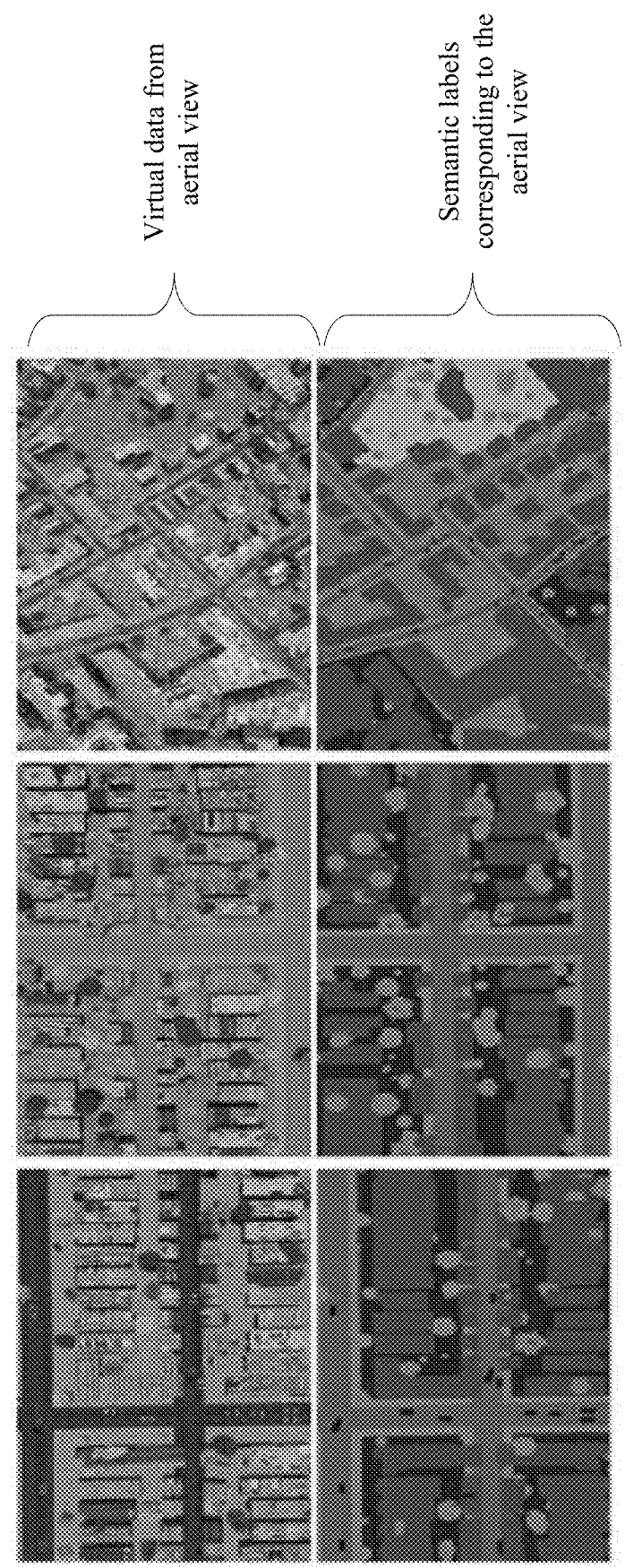
FIG. 15 is a drawing illustrating virtual aerial data that can be used by the system of the present disclosure and corresponding semantic labels that can be generated by the system of the present disclosure.

With respect to scene understanding, as noted above, the CityScapes dataset provides 267 images that were captured in Frankfurt as a part of its validation set. As discussed above, the system can, for example, split this subset into two parts: one with 67 images (real_FF_dev) and the other one with 200 images (real_FF_test). To generate virtual data that can generalize well to real_FFJest, the system can create texture-maps from real_FF_dev images for building facades and roads. Using these texture-maps and OSM map information of Frankfurt regions in the generation tool, the system can simulate 5,000 images along with semantic labels, which can be labelled as virtual_FF. Examples of these samples can be seen in FIG. 14. The first row illustrates virtual data of an image. To account for the impact of bad weather on the trained models, the system also simulate these images with fog effect as shown in the second row of FIG. 14. The third row of FIG. 14 shows semantic labels generated by the system corresponding to the virtual data of the rows above.

With respect to aerial image understanding and aerial image labeling tasks, the INRIA aerial dataset can provide 36 aerial images (of resolution 5,000×5,000) captured over Chicago. The present disclosure is not limited to this database. The system can split this subset into two parts: one with 6 images (real-CC_dev) and the other one with 30 images (real_CC_test). The system can generate a dataset (virtual-CC) to generalize to real_CC_test images. As explained above, the system can use texture maps that were created from real-CC-dev images for building rooftops and OSM info from Chicago regions to simulate 1,000 images. The system can also use aerial views of the virtual_FF set as the rooftops of those Frankfurt buildings were also textured with Chicago texture maps. Accordingly, this set in total can amount to 2,500 images of 500×500 resolution. Examples of these can be seen in FIG. 15 where the top row illustrates virtual data from an aerial view and the bottom row illustrates the data having semantic labels. Although the virtual data can have several labels (e.g., building, roads, footpaths, vehicles, used-lands, trees, water-bodies etc.), the system can in some embodiments consider only building labels as real Chicago images have only building and non-building labels (although the present disclosure is not limited as such).

Semantic segmentation and virtual data will now be explained in greater detail. In particular, traffic scene semantic labelling will now be explained in greater detail. The system can, in some embodiments, be used in the context of $$\frac{TP}{TP + FP + FN}$$

semantic segmentation of urban traffic scenes using the "SegNet" architecture. Although some datasets can have high-resolution images, the system can, in some embodiments, use downsized images (640×480) to speed up training processes and save memory. To assess performance, the system can use a standard performance metric, known as the intersection-over-union metric, IoU=where TP, FP, and FN are the numbers of true positive, false positive, and false negative pixels respectively, determined over the whole set. FIG. 16 illustrates IoU performance measures of SegNet for all train-test combinations.

The system can first assess whether behavior of SegNet model is similar in real and virtual worlds by comparing the performance (of the SegNet model trained on entire CityScapes-train data) on both real_FF and virtual_FF data. According to IoU performance of object classes building and roads, the statistical gap between virtual_FF and real_FF test is minimal compared to arbitrary simulated data that has 5,000 randomly selected samples from a SYNTHIA dataset. This difference is less for virtual_FF (1%) according to mIoU which summarizes the performance on all object classes. The system can train SegNet with all three sets (virtual_FF, arbSIM and CBCL) separately to find out which has better generalization to real_FF_test. The system of the present disclosure is not limited to SegNet or these training sets. FIG. 16 conveys that the use of virtual_FF leads to a semantic segmentation unit with improved generalization performance of at least 11%. This is for both building and road classes when compared with a scheme trained on CBCL Jrain (data from Boston) and arbSIM (arbitrarily simulated data). Accordingly, the system of the present disclosures reduces domain shift by incorporating appropriate auxiliary information specific to the target domain.

The system can also use a dataset real_FF_dev (labeled real samples from Frankfurt) to further enhance domain shift accuracy. In particular, the system can employ a balanced gradient contribution when training on mixed domains/sets. This includes building batches with images from both domains (synthetic and real), given a fixed ratio (e.g., 3:1). Accordingly, the system can use and consider data of both domains in the training procedure which can create a model which is accurate for both domains. The system can have huge performance boosts for all training sets, for example, when it is augmented with real_FF-dev. Indeed, virtual FF can have maximum improvement in almost all classes. Accordingly, the data generated by the system of the present disclosure can complement the limited amounts of real labeled data.

The system can also use and evaluate a SegNet model in fog weather, to demonstrate the utility of the tool to characterize the performance of a given computer vision model with respect to scene contexts. In this scenario the system can simulate virtual_FF samples with fog effect as shown in the second row of FIG. 14. The system can use this as a dataset for SegNet model trained on CS Jrain. Using the processes of the system of the present disclosure, quantitative analysis of the impact of single scene-parameters or rarely occurring events can be conducted.

Figure 17:
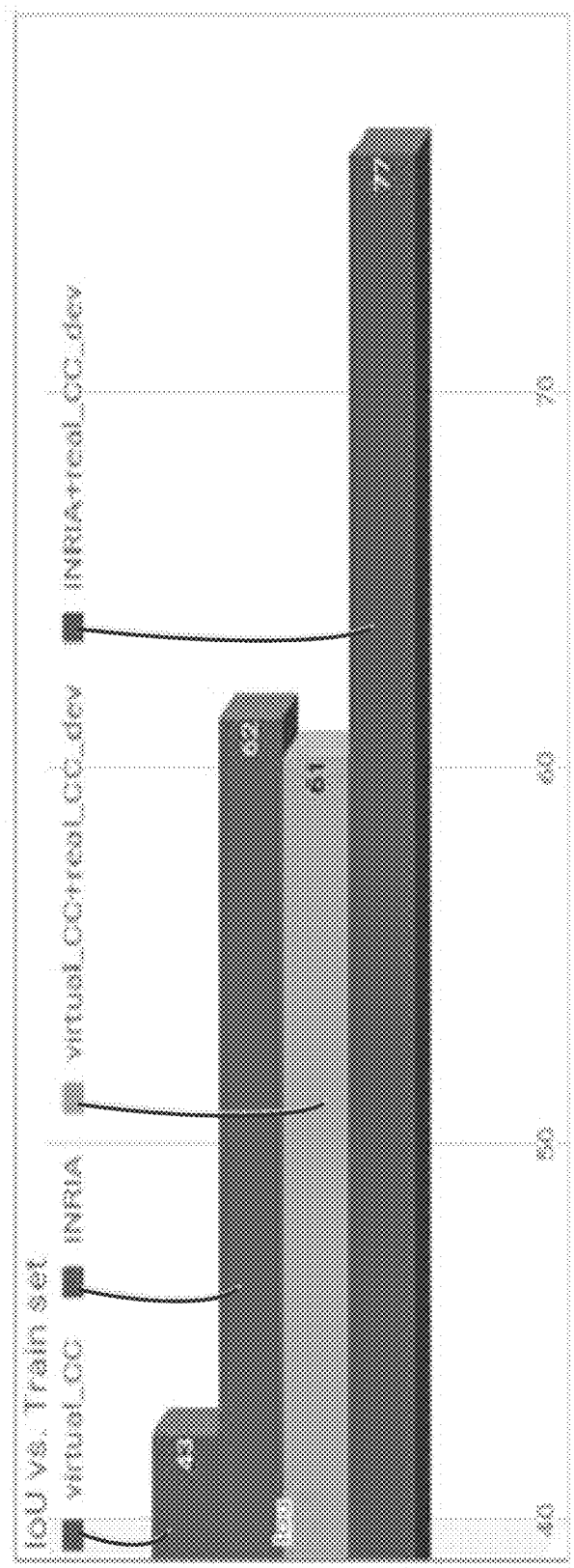
FIG. 17 is a graph illustrating quantitative results of aerial image segmentation by the system of the present disclosure.

The system of the present disclosure can perform aerial image labelling using a simulation platform to generate training data. The INRIA dataset can be used which includes images that were captured over several cities including Austin, West Tyrol, Vienna, etc. The present disclosure is not limited to this dataset. This dataset can also provide 36 images of Chicago which can be used the target domain data. The system can split this set into two parts: one with 6 images (real_CC-dev) and the other with 30 images (real_CC-test). As noted above, the system, can simulate a set virtual_CC using the texture maps from real_CC dev and Chicago information from OSM. The performance results (IoU measures on real_CC_test) of Seg-Net models trained on different sets can be seen in FIG. 17. In some embodiments, the system can use the SegNet model when it is trained only on virtual_CC to achieve better performance. The system can augment the simulated data with real_CC_dev data to further enhance the generalization as shown in FIG. 17. Accordingly, the system of the present disclosure can leverage huge amounts of virtual data along with existing real world benchmark datasets to boost the aerial image labeling of the present disclosure.

Figure 18:
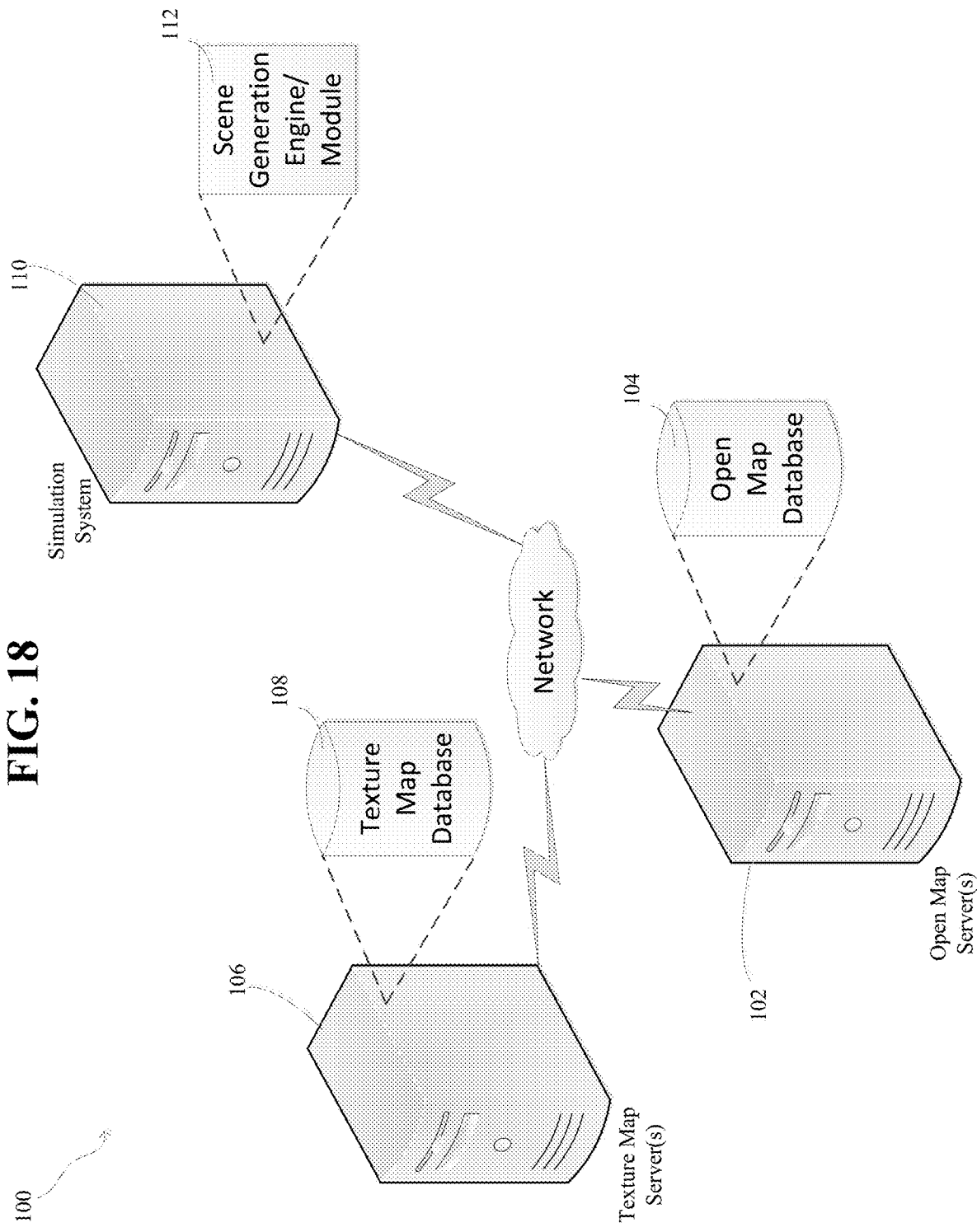
FIG. 18 is a diagram of hardware and software components of the system of the present disclosure.

FIG. 18 is a system diagram of a system 100 of the present disclosure as discussed in detail above. The system can include one or more open map servers 102 having an open map database 104. The system can also include one or more texture map servers 106 having a texture map database 108. The system can also include one or more simulation systems 110 having a scene generation engine or module 112 for executing the processes described above. These servers can be in communication with each other over a network such as the Internet. The servers of the system 100 can include a storage device, a network interface, a communications bus, a central processing unit (CPU) (microprocessor), a random access memory (RAM), and one or more input devices, such as a keyboard, mouse, etc. The servers could also include a display (e.g., liquid crystal display (LCD), cathode ray tube (CRT), etc.). The storage devices could comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). The servers could be a networked computer system, a personal computer, a smart phone, tablet computer etc. It is noted that the servers need not be a networked server, and indeed, could be a stand-alone computer system. The functionality provided by the present disclosure could be provided by the scene generation engine or module 112, which could be embodied as computer-readable program code stored on the storage device and executed by the CPU using any suitable, high or low level computing language, such as Python, Java, C, C++, C#, .NET, MATLAB, etc. The network interface could include an Ethernet network interface device, a wireless network interface device, or any other suitable device which permits the servers to communicate via the network. The CPU could include any suitable single- or multiple-core microprocessor of any suitable architecture that is capable of implementing and running the scene generation engine or module 112 (e.g., Intel processor). The random access memory could include any suitable, high-speed, random access memory typical of most modern computers, such as dynamic RAM (DRAM), etc.

Based on the processes described in detail above, the system 100 of the present disclosure can generate 3D outdoor scene (city/street) layouts that can synthesize virtually unlimited amounts of training data for supervised learning. The system 100 can use the data from open street maps and random texture maps to create large scale detailed scene layouts. Using these processes, the system 100 can generate simulated data with less domain-shift and high generalization capabilities to the target geographical region (for instance, Frankfurt or Chicago streets). The generalization capabilities of the system 100 of the present disclosure can generate simulated data (generated using target domain's knowledge) that can provide greater benefits than that of arbitrarily simulated data or real labeled data from other geographic locations.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is desired to be protected by Letters Patent is set forth in the appended claims.

What is claimed is:

1. A system for generating a simulated scene from open map data for training a machine learning system, comprising:
    a simulation computer system;
    means for receiving open map data;
    means for receiving texture map data; and
    a scene generation software engine executed by the simulation computer system, the scene generation software engine causing the simulation computer system to:
        generate a three-dimensional (3D) scene layout using the open map data and the texture map data;
        capture the scene layout from a plurality of different camera view points; and
        generate machine learning training data using the captured scene layout.

2. The system of claim 1, wherein the scene generation software engine further causes the simulation computer system to present a bounding box to a user of the simulation computer system.

3. The system of claim 2, wherein the bounding box allows the user to define a geographical region of interest.

4. The system of claim 1, wherein the scene generation software engine further causes the simulation computer system to perform a stochastic process on the scene layout to add virtual objects to the scene layout.

5. The system of claim 1, wherein the scene generation software engine further causes the simulation computer system to add simulated lighting and weather conditions to the scene layout.

6. The system of claim 1, wherein the scene generation software engine further causes the simulation computer system to project buildings, roads, vegetation, and bodies of water as two-dimensional planes.

7. The system of claim 6, wherein the scene generation software engine further causes the simulation computer system to add heights to each building plane and each building polygon.

8. The system of claim 7, wherein the scene generation software engine further causes the simulation computer system to store road lanes as polygons.

9. The system of claim 8, wherein the scene generation software engine further causes the simulation computer system to extrude road planes having lane-width parameters.

10. The system of claim 9, wherein the scene generation software engine further causes the simulation computer system to create a final 3D mesh scene layout using the two-dimensional planes, heights, polygons, and the extruded road planes.

11. The system of claim 9, wherein the scene generation software engine further causes the simulation computer system to apply the texture map data to the 3D mesh to create the scene layout.

12. The system of claim 1, wherein the scene generation software engine further causes the simulation computer system to obtain a 3D computer-aided design (CAD) file of virtual objects and add the virtual objects to the scene layout.

13. The system of claim 1, wherein the scene generation software engine further causes the simulation computer system to capture aerial and ground views using different camera viewpoints and extract images or videos including semantic labels associated with the captured aerial and ground views.

14. A method for generating a simulated scene from open map data for training a machine learning system, comprising:
    receiving open map data;
    receiving texture map data
    generating at a simulation computer system a three-dimensional (3D) scene layout using the open map data and the texture map data;
    capturing the scene layout from a plurality of different camera view points; and
    generating machine learning training data using the captured scene layout.

15. The method of claim 14, further comprising presenting a bounding box to a user of the simulation computer system and allowing the user to define a geographical region of interest.

16. The method of claim 14, further comprising performing a stochastic process on the scene layout to add virtual objects to the scene layout.

17. The method of claim 14, further comprising adding simulated lighting and weather conditions to the scene layout.

18. The method of claim 14, further comprising projecting buildings, roads, vegetation, and bodies of water as two-dimensional planes.

19. The method of claim 18, further comprising adding heights to each building plane and each building polygon.

20. The method of claim 19, further comprising storing road lanes as polygons.

21. The method of claim 20, further comprising extruding road planes having lane-width parameters.

22. The method of claim 21, further comprising generating a final 3D mesh scene layout using the two-dimensional planes, heights, polygons, and the extruded road planes.

23. The method of claim 22, further comprising applying the texture map data to the 3D mesh to create the scene layout.

24. The method of claim 14, further comprising obtaining a 3D computer-aided design (CAD) file of virtual objects and add the virtual objects to the scene layout.

25. The method of claim 14, further comprising capturing aerial and ground views using different camera viewpoints and extract images or videos including semantic labels associated with the captured aerial and ground views.

* * * * *